United States Patent
Balasubramanian et al.

(10) Patent No.: US 7,649,912 B2
(45) Date of Patent: Jan. 19, 2010

(54) TIME SYNCHRONIZATION, DETERMINISTIC DATA DELIVERY AND REDUNDANCY FOR CASCADED NODES ON FULL DUPLEX ETHERNET NETWORKS

(75) Inventors: Sivaram Balasubramanian, Solon, OH (US); Anatoly Moldovansky, Pepper Pike, OH (US); Kendal R. Harris, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 761 days.

(21) Appl. No.: 11/115,536

(22) Filed: Apr. 27, 2005

(65) Prior Publication Data

US 2006/0245454 A1    Nov. 2, 2006

(51) Int. Cl.
*H04J 3/06* (2006.01)
(52) U.S. Cl. ............... 370/509; 370/503; 375/354; 375/355; 375/356; 375/359; 713/400; 713/401
(58) Field of Classification Search ........... 370/503, 370/509; 375/354, 355, 356, 359; 713/400, 713/401
See application file for complete search history.

(56) References Cited

U.S. PATENT DOCUMENTS

| | | | |
|---|---|---|---|
| 5,392,421 A * | 2/1995 | Lennartsson | 713/400 |
| 5,644,486 A * | 7/1997 | Chang et al. | 700/3 |
| 5,815,085 A * | 9/1998 | Schneider et al. | 340/3.31 |
| 6,760,309 B1 * | 7/2004 | Rochberger et al. | 370/235 |
| 2002/0064157 A1 | 5/2002 | Krause | |
| 2002/0131454 A1 | 9/2002 | Franke et al. | |
| 2002/0169844 A1 * | 11/2002 | Jammes et al. | 709/207 |
| 2003/0002483 A1 * | 1/2003 | Zwack | 370/352 |
| 2003/0002520 A1 * | 1/2003 | Zwack | 370/458 |

(Continued)

FOREIGN PATENT DOCUMENTS

EP     0722233 A     7/1996

(Continued)

OTHER PUBLICATIONS

Sivaram Balasubramanian, Anatoly Moldovansky and Kendal R. Harris: "Investigation of IEEE 1588 on Gigabit Ethernet, Priority Tagged Frames and Ethernet Daisy Chain", Proceedings of the 2005 IEEE-1588 Conference, [Online] Oct. 10, 2005, XP002384684 NIST, Zurich University of Applied Science and I&M Society of the IEEE. Retreieved from the Interent: URL: http://ieee1588.nist.gov.

(Continued)

*Primary Examiner*—Ricky Ngo
*Assistant Examiner*—Luat Phung
(74) *Attorney, Agent, or Firm*—Boyle Fredrickson LLP; R. Scott Speroff

(57) ABSTRACT

A method and circuit for precisely synchronizing clocks in separate nodes on a communication network is provided by adjusting timestamps and related data in network messages. The circuit will allow a daisy-chain connection of the nodes and will forward time synchronization frames while accounting for delays in a manner that does not use boundary clocks, but does not depart from the IEEE 1588 standard protocol. The delays will be added on the fly to synchronization packets and the IP checksum and frame CRC will be adjusted. Deterministic data delivery and redundant data paths are also provided in a full duplex Ethernet network.

26 Claims, 5 Drawing Sheets

U.S. PATENT DOCUMENTS

| | | | |
|---|---|---|---|
| 2003/0171831 A1* | 9/2003 | Wucherer et al. | 700/61 |
| 2004/0141517 A1 | 7/2004 | Balasubramanian et al. | |
| 2004/0141526 A1 | 7/2004 | Balasubramanian et al. | |
| 2005/0058149 A1* | 3/2005 | Howe | 370/428 |
| 2005/0058159 A1* | 3/2005 | Chapman | 370/510 |
| 2005/0261796 A1* | 11/2005 | Shen | 700/121 |
| 2005/0286564 A1* | 12/2005 | Hatley et al. | 370/503 |
| 2006/0184272 A1* | 8/2006 | Okazaki et al. | 700/245 |
| 2006/0251084 A1* | 11/2006 | Elliot | 370/398 |

FOREIGN PATENT DOCUMENTS

| | | |
|---|---|---|
| WO | WO 03/028258 A1 | 4/2003 |
| WO | WO 03/028259 A1 | 4/2003 |

OTHER PUBLICATIONS

Kannisto J. et al: Precision Time Protocol Prototype on Wireless LAN Lecture Notes in Computer Science, Springer Verlag, New York, NY, US, 2004, pp. 1236-1245, XP0190095251 ISSN: 0302-9743.

Prof. Thomas Muller and Karl Weber: "Impact of Switch Cascading on Time Accuracy", Workshop on IEEE-1588, Standard for a Precision Clock Synchronization Protocol for Networked Measurement and Control Systems, [Online] Sep. 24, 2003, pp. 71-76, XP002384685, National Institute of Standards and Technology (NIST) Retrieved from the Internet: URL:http://ieee1588.nist.gov/z_Workshop_2003_proceedings.pdf [.

Gaderer G. et al.: "Extending IEEE 1588 to fault tolerant clock synchronization", Factory Communication Systems, 2004. Proceedings. 2004 IEEE International Workshop on Vienna, Austria Sep. 22-24, 2004, Piscataway, NJ, USA, IEEE, Sep. 22, 2004, pp. 353-357, XP010756165, ISBN: 0-7803-8734-1.

Butner S E et al. "Nanosecond-scale even synchronization over local-area networks" Local Computer Networks, 2002. Proceedings. LCN 2002. 27$^{TH}$ Annual IEEE Conference on Nov. 6-8, 2002, Piscataway, NJ, USA, IEEE, Nov. 6, 2002, pp. 261-269, XP010628175, ISBN: 0-7695-1591-6.

Gramann T. et al.: Precision Time Protocol IEEE 1588 in Der Praxis Zeitsynchronisation IM Submikrsekundenbereich Electronic, Weka Fachzeitschriftenverlag, Poing, DE, vol. 52, No. 24, Nov. 25, 2003, pp. 86-91, 93, XP001177441, ISSN: 0013-5658.

Ludwig Winkel: "PTP In redundant network strutures", Workshop on IEEE-1588, Standard for a Precision Clock Synchronization Protocol for Networked Measurement and Control Systems, Sep. 24, 2003, pp. 38-42, XP002385114, National Institute of Standards and Technology (NIST).

* cited by examiner

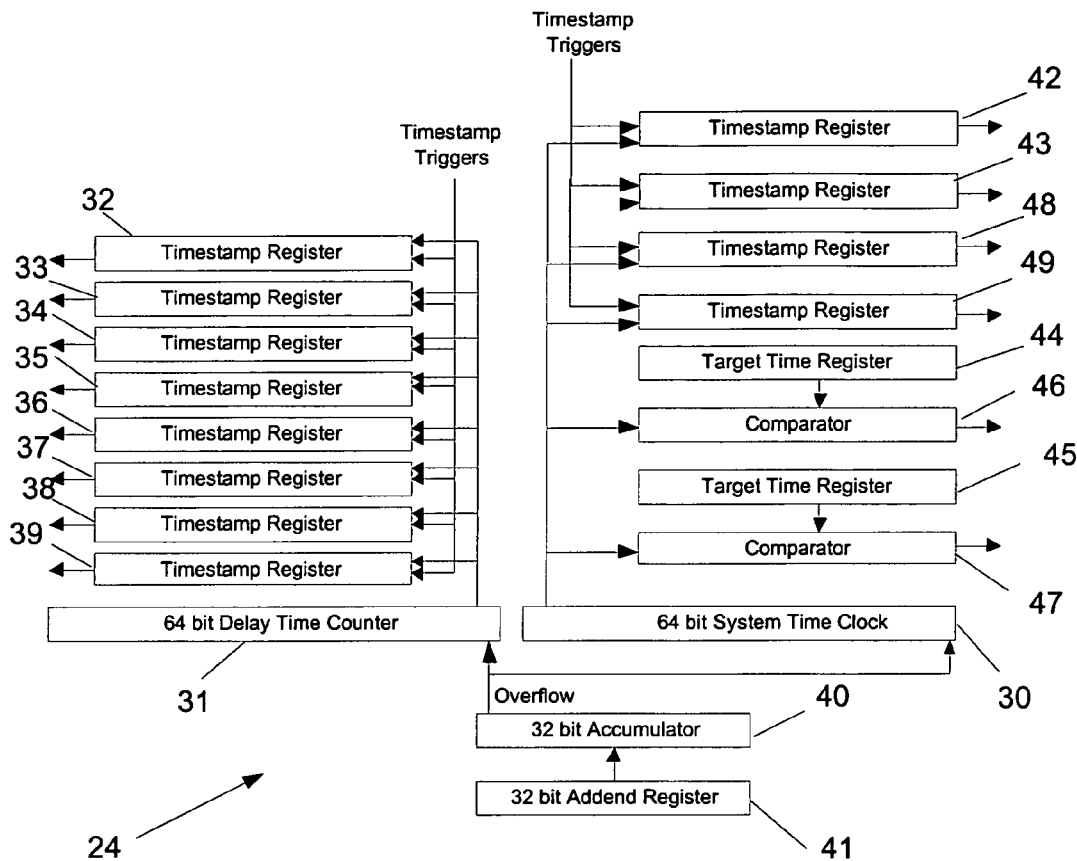
Fig. 3
N1-N2-N3-N4-N5
Fig. 4a
⌈ N1-N2-N3-N4-N5 ⌉
Fig. 4b
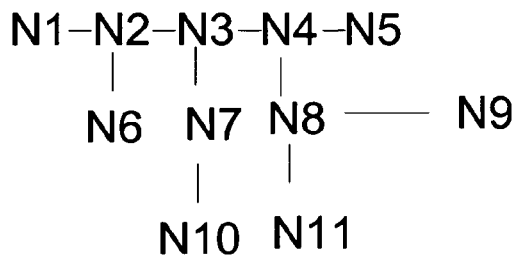
Fig. 4c

TIME SYNCHRONIZATION, DETERMINISTIC DATA DELIVERY AND REDUNDANCY FOR CASCADED NODES ON FULL DUPLEX ETHERNET NETWORKS

CROSS-REFERENCE TO RELATED APPLICATIONS

Not applicable

STATEMENT REGARDING FEDERALLY SPONSORED RESEARCH OR DEVELOPMENT

Not applicable

TECHNICAL FIELD

The present invention relates generally to industrial control devices for the control of machines and processes and in particular, industrial control devices which can be connected to a distributed high speed network.

BACKGROUND ART

In industrial control, there is a class of distributed motion control applications that require both precision time synchronization and deterministic data delivery. Precision time synchronization at the nodes can be achieved with a network communication protocol according to IEEE 1588, Standard for a Precision Clock Synchronization Protocol for Networked Measurement and Control Systems, 2002, and by using frequency-compensated clocks as disclosed in our prior U.S. patent application Ser. No. 10/347,658 filed Jul. 22, 2003. Motion control applications also require deterministic data delivery, which means that input data will be received and output data will be transmitted at specific time points based on predetermined periodic intervals. This requires coordination of network bandwidth with resources at the intermediate and end nodes. One way to coordinate network bandwidth uses precise and detailed scheduling of both data production and network transmissions for data delivery. Another way uses a combination of coarse scheduling of data production and the use of frame priorities to prioritize network transmissions for data delivery according to IEEE 802.3, Part 3, Standard for Carrier Sense Multiple Access with Collision Detection Access Method and Physical Layer Specification, 2002.

In distributed control applications, it is desirable to have a daisy-chain network bus topology due to simplified wiring requirements. It is also desirable to provide a redundant data delivery path in case of a network failure. This bus topology can be accomplished through half duplex Ethernet, but this type of network has several drawbacks such as collisions, a 100-meter copper cable length limit and technology obsolescence. To avoid collisions in this type of network, fine scheduling and control of transmissions are necessary. Further, data throughput is limited to 100 Mbps by the half duplex nature of network. These limitations make it undesirable to use half duplex Ethernet for distributed motion control applications.

Full duplex Ethernet uses switching technology to avoid collision domains and doubles peak data throughput to 200 Mbps through concurrent transmission and reception. The use of switches in network topology results in a typical star configuration. The switches avoid collision by queuing Ethernet frames on a per port basis. In order to avoid propagating errors on received frames, most switches use store and forward architecture, in which the frames are queued even when there is no resource contention on a port. This results in a delay corresponding to frame size plus intrinsic queuing and switching delay.

It is also possible to connect switches in a daisy-chain topology with full duplex Ethernet. The maximum copper cable length limit is raised to (N+1)*100 meters for N switches. However, significant problems result for time synchronization and deterministic data delivery in a network with this topology. There are random time delays introduced by the switches that affect time synchronization resulting in loss of synchronization precision and stability. Under current technology with IEEE Standard 1588, a boundary clock can be used on every switch node to manage time synchronization between an upstream master clock and downstream slave clocks. Even with use of boundary clocks on switches, it is difficult to achieve sub-microsecond level precision synchronization required for distributed motion control, when more than four switches are cascaded.

As mentioned above, in order to avoid propagating errors on received frames, most switches use store and forward architecture, in which the frames are queued even when there is no resource contention on a port. With store and forward architecture, significant random cumulative delays are introduced in the data delivery path resulting in non-deterministic data delivery and other performance issues.

One object of the invention is to provide time synchronization of the daisy-chain connected network nodes. Another object of the invention is to provide deterministic data delivery. Another object of the invention is to provide a redundant data path in the event of a network failure.

SUMMARY OF THE INVENTION

The present invention provides a method and circuit for time synchronization of daisy-chained node clocks. The circuit includes a network switch, which can be included in each node in the network. The switch will allow a cascaded connection of the nodes in any binary tree topology and will forward time synchronization frames while accounting for delays in a manner that does not use boundary clocks, but does not depart from the IEEE 1588 standard protocol.

To achieve precision time synchronization, the node switch will accurately account for delays through the switch. The delays will be added on the fly to synchronization packets and the UDP checksum and frame CRC will be adjusted. This approach will result in significant improvement over systems using boundary clocks.

Deterministic bidirectional data delivery for distributed motion control is facilitated by the cut through forwarding nature of embedded switch, enforcement of frame priorities encoded by origin nodes on network transmissions by embedded switch and by coarse scheduling of motion control loops. Since motion control loops are synchronized to a coarse schedule and all nodes are precisely time synchronized, all nodes will transmit almost at the same relative point every time resulting in minimal contention on switches. With these changes, the daisy chain with distributed embedded switches will look like a single switch for an end device. It should be noted that none of these changes is a departure from the IEEE 802.3 standard or the IEEE 1588 standard.

In a further aspect of the invention, redundancy is provided by extending the daisy chain to a ring topology. In this case, a designated supervisory device will have one master clock with two specialized ports and a specialized signaling protocol for providing redundancy. The end nodes will measure and save delay times of two paths of ring topology through two ports of the master node. During normal operation, the supervisory device will break endless circulation of packets from the second port to the first port and vice versa, and will simultaneously monitor traffic by sending special packets on the first port and tracking them on the second port. Simultaneously, the supervisory device and end nodes will monitor link status of their ports periodically and the end nodes will notify the supervisory device in case of failure of a port through other port. When the supervisory device detects or is notified of a network failure, it will broadcast this status to all nodes through two different messages on its two ports. Furthermore, it will forward all packets from one port to other, effectively converting the network to bus topology. On receiving the broadcast, those end nodes that received the message from second port on supervisory device will switch to measured and saved delay of second path through second port of master clock. Those end nodes that received broadcast from the first port on supervisory device will take note of situation and will continue using measured delay through first path. By switching the time delay, time synchronization will continue to function correctly. By switching to bus topology, data delivery will continue to function correctly. Since the end nodes can tolerate short-term loss of synchronization messages and control data from network failure to topology transition, the system will function continuously. Through additional messages the supervisory device can pinpoint failure and signal an operator for network maintenance. After the operator notifies about completion of maintenance, the system will go through a reverse process to return to normal mode of operation.

BRIEF DESCRIPTION OF THE DRAWINGS

FIG. 3 is a detailed block diagram of the frequency compensated clock, time stamp registers and target timers portion of FIG. 2;

FIGS. 4a-4c are diagrams of possible node connections using the switch of FIG. 2;

DETAILED DESCRIPTION OF THE PREFERRED EMBODIMENTS

Figure 1:
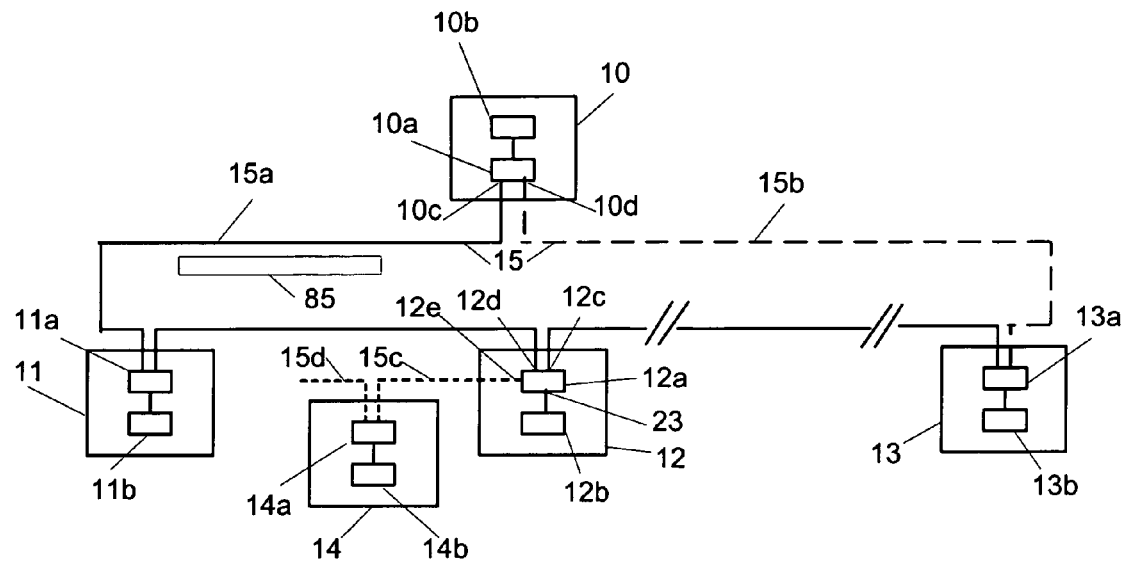
FIG. 1 is a system diagram illustrating a network with nodes according to the present invention.

Referring now to FIG. 1, nodes 10, 11, 12 and 13 are connected through a communication network 15. In this embodiment the network 15 is a full duplex Ethernet network operating at data rates up to 200 Mbps. Nodes 10, 11, 12 and 13 may be, for example, industrial controllers, network bridges, remote I/O modules, standard motor drives, servo motor drives, or human-machine interfaces. If any of these nodes are controllers, then these controllers may be connected to local I/O modules and devices, including motion control devices for controlling motors, robots and other motion devices. To provide redundant network connections, the network 15 can take the form of a ring with two data paths 15a and 15b communicating with two respective ports 10c and 10d on a designated supervisory node device 10. The designated supervisory node device 10 may be a special controller, a special network bridge or any other special device designed for this role. This device has one master clock from which timestamp data is communicated through two specialized ports: a first port 10c and a second port 10d.

Figure 2:
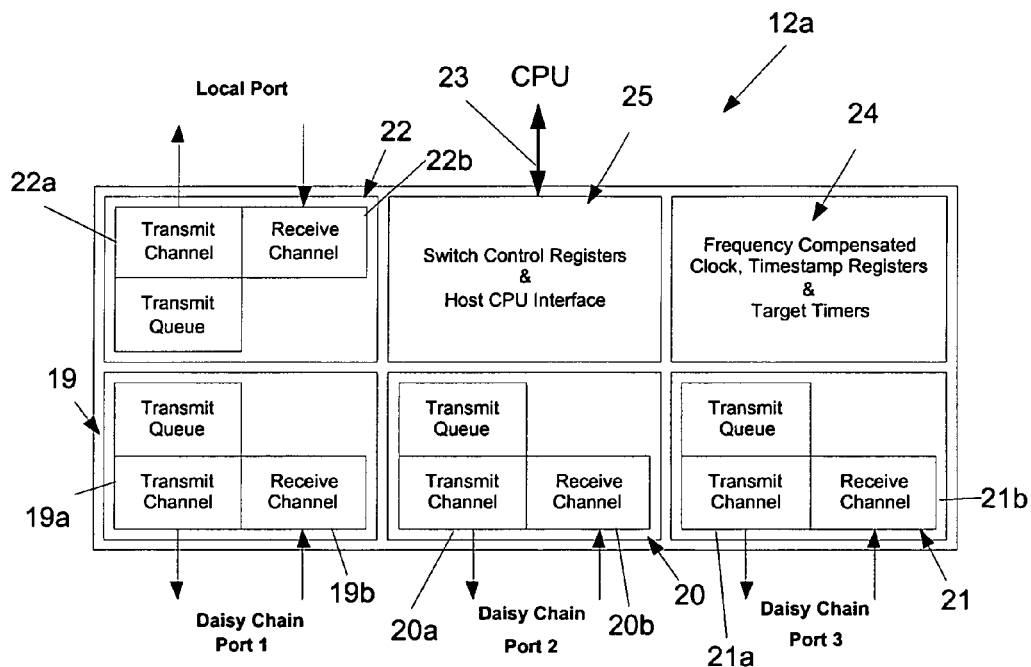
FIG. 2 is a detailed block diagram of a switch used in the nodes of FIG. 1.

To facilitate a full duplex daisy chain a special purpose switch 10a, 11a, 12a, 13a, as exemplified by switch 12a, in the form of an FPGA (field programmable gate array) or other ASIC (application specific integrated circuit) is provided for each node. Referring to FIG. 2, the switch has three daisy chain ports 19, 20, 21 and a local port 22. All three daisy chain ports are identical in capabilities and are interchangeable. Two daisy chain ports can be used for uplinking and downlinking on the daisy chain. The third daisy chain port 21 can be used to start a new daisy chain (like 15c to node 14 on FIG. 1). Referring to FIG. 1, each of the nodes 10, 11, 12, 13 and 14 includes a CPU 10b, 11b, 12b, 13b and 14b respectively. Referring to FIG. 2, in the switch 12a, the local port 22 and host CPU bus interface 23 are used to communicate with local host CPU.

With three daisy chain ports on the embedded switch, complex daisy chains of any binary tree topology can be constructed. As seen in FIG. 4a, with a simple bus topology daisy chain the usual connection of nodes N1-N2-N3-N4-N5 occurs along a single data path. FIG. 4b illustrates ring topology redundant data paths by closing the loop from node N5 to node N1. FIG. 4c illustrates a complex daisy chain network made possible by the third daisy chain port 21 in the switch 12a. The main data path is through nodes N1 to N5. An additional duplex data path is formed from node N2 to N6 and another duplex data path from node N3 to nodes N7 and N10, and still another duplex data path is formed from node N4 to nodes N8, N9 and N11.

Figure 9:
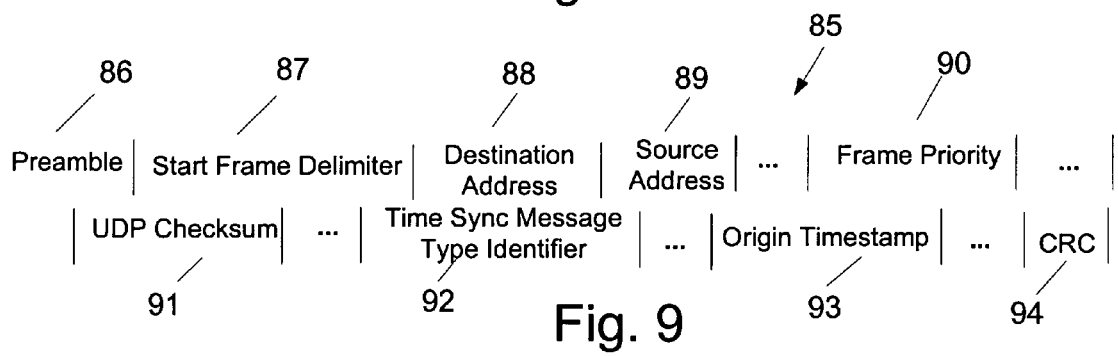
FIG. 9 is an abridged message frame map of a time-synchronization message that is transmitted on the network of FIGS. 1, 7 and 8.
Figure 10:
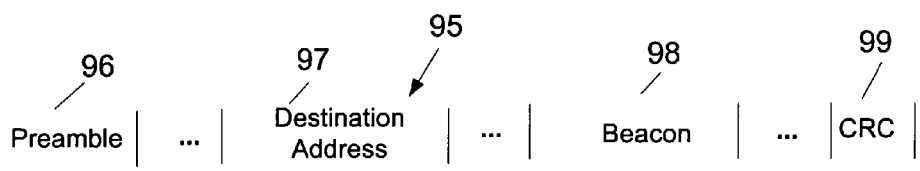
FIG. 10 is an abridged message frame map of a beacon message which is periodically transmitted on the network of FIG. 7.

Referring again to FIG. 1, each of the nodes 10, 11, 12, 13 and 14 sends and receives message frames defined by IEEE standard 1588, which is hereby incorporated by reference. Following this protocol, the node 10 as a time master node may send a "synchronize" time synchronization message frame 85 to network time slave nodes 11, 12, 13 and 14. Similarly, nodes 11, 12, 13 and 14, as time slaves, may send a "delay request" time synchronization message frame 85 to the master node 10. As seen in FIG. 9, the time synchronization message frame 85 includes fields for a preamble 86, a start of frame delimiter 87, a destination address 88, a source address 89, a frame priority number 90, a UDP checksum 91, a time synchronization message type identifier 92, an origin timestamp 93 and a CRC 94 (cyclic redundancy checking code).

The CPUs 10b, 11b, 12b, 13b and 14b on network nodes 10, 11, 12, 13 and 14 encode a highest priority to time synchronization message frames, a lower priority to motion control data message frames, a still lower priority to message frames with discrete or process I/O data and a lowest priority to message frames with non-critical configuration and other data. The switch uses encoded priority information to prioritize network transmissions and accords lowest priority to message frames without any priority information. The term "frame" means a unit of transmitted data under the applicable IEEE standards.

In the present embodiment, the motion control data is managed by coarse schedulers in the motion controller and in the servo drives. The coarse schedulers may require an update every 250 microseconds and the 250-microsecond loop starts on all nodes (both controller and drives) within one microsecond of each other. Alternatively, the coarse schedulers may stagger the 250-microsecond loops and the loops will have to start within one microsecond from required starting points. In either case, the latter is a phase relationship that requires accurate time synchronization.

Time synchronization is a fundamental requirement for distributed motion control and certain classes of distributed control. This is different from traditional process/discrete control systems.

For instance, a process/continuous controller may require I/O updates once every 20 milliseconds at most, but there is no explicit need to synchronize phase relationships. Similarly a discrete control controller may require I/O updates once every 1 millisecond at most without a need to maintain phase relationship.

Without compensation for time differences, individual nodes will drift apart and report different times. For most systems, including networked computers, an accuracy on the order of one to ten milliseconds is sufficient and this can be obtained in software. For distributed motion control systems, a more stringent requirement of sub-microsecond accuracy is needed.

The CPUs 10b, 11b, 12b, 13b and 14b on network nodes 10, 11, 12, 13 and 14 each communicate with the network switches 10a, 11a, 12a, 13a and 14a, respectively and in particular with their registers as seen in FIG. 2 for switch 12a.

FIG. 3 shows the circuitry 24 included in switch 12a in FIG. 2. A 64-bit delay time counter 31 in every switch is set initially to zero. In one embodiment, an oscillator circuit (not shown) provides a clock signal to an accumulator 40 causing the accumulator 40 to add a value received from an addend register 41 to the current contents of the accumulator 40. Repeated addition operations triggered by the oscillator cause a regular overflow of the accumulator 40 at an overflow output of the accumulator 40. The signal from the overflow output strobes a count input of the delay time counter 31 for the node. The value in the addend register 41 may be written and read by the CPU 12b, so that CPU 12b may effectively control the frequency of delay time counter 31. In an alternative embodiment, an oscillator circuit may directly strobe the count input of delay time counter 31.

There are four ports on the network switch 12a, each with transmit and receive channels for a total of eight channels that are operating in parallel. One timestamp register 32-39 based on delay time counter 31 is provided for each channel. A 64-bit system time clock 30 is provided for tracking synchronized time in every node. The count input of system time clock 30 is strobed by the overflow output of accumulator 40. Two timestamp registers 42 and 43 based on the system time clock are provided for timestamping "synchronize" and "delay request" time synchronization messages. Two message detector circuits (not shown) in transmit 22a and receive 22b channels of local port 22 trigger timestamp on registers 42 and 43. The host CPU 12b uses these registers to compute values for the addend register 41. Further details on system time clock 30, addend register 41, accumulator 40, two timestamp registers 42, 43, message detector circuits and the procedure to compute values for addend register 41 are described in U.S. patent application Ser. No. 10/347,658, cited above, which description is incorporated herein by reference. Additional timestamp registers 48 and 49 based on the system time clock are provided for timestamping "delay request" messages through second port, a feature useful in redundancy and capturing external events such as synchronization with a global positioning system or external clocks. The target time registers 44, 45 are provided to set future time notification. When one of the comparators 46, 47 sees that the system time clock equals target time in its associated register 44, 45, it will send an interrupt signal to the host CPU 12b. Multiple target timers are provided so that host CPU 12b can use each for a dedicated purpose, for example, one for normal scheduling and the other for redundancy.

Figure 5:
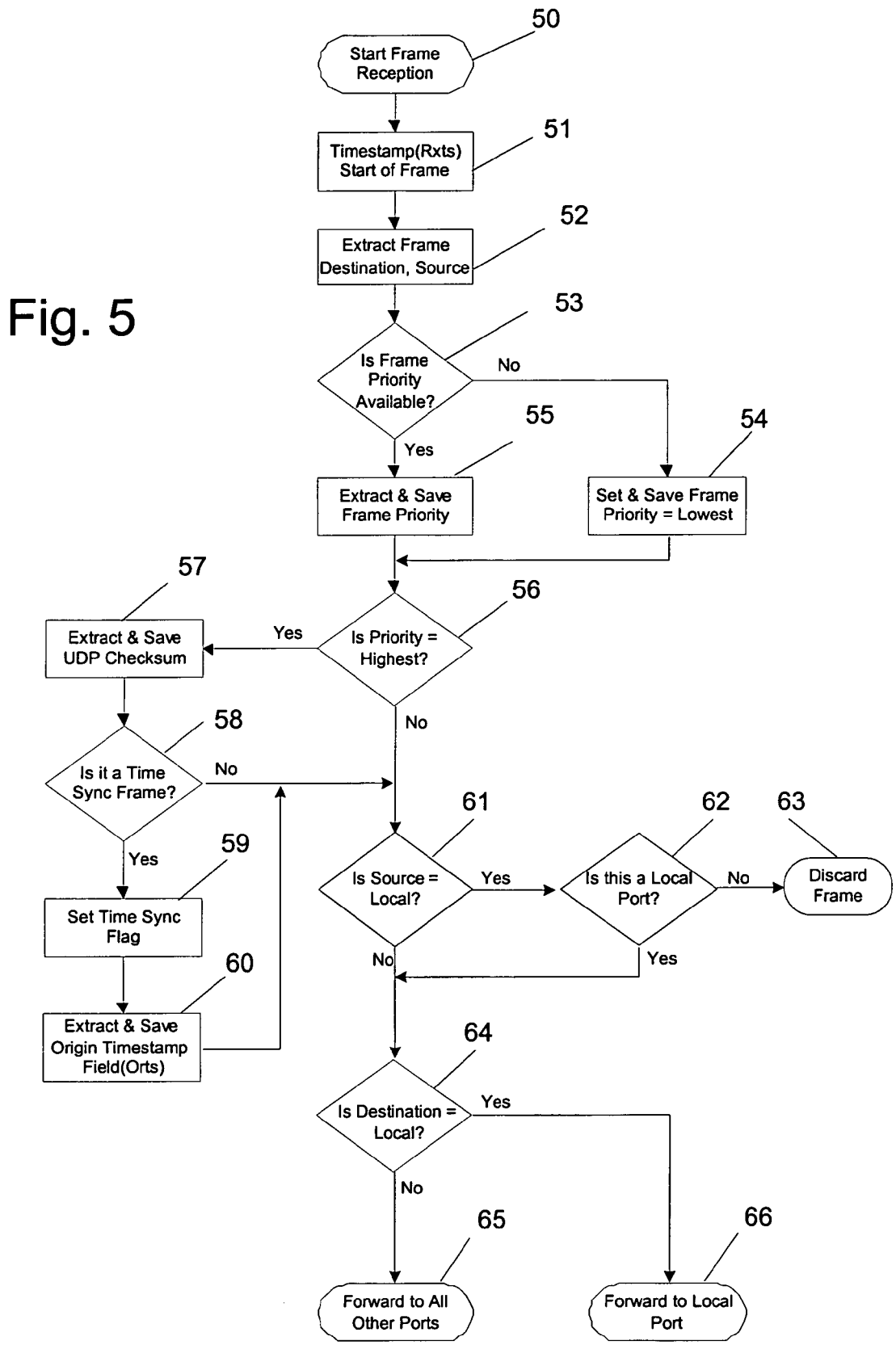
FIG. 5 is a flow chart for the transmit channel hardware logic of any port in the switch of FIG. 2.
Figure 6:
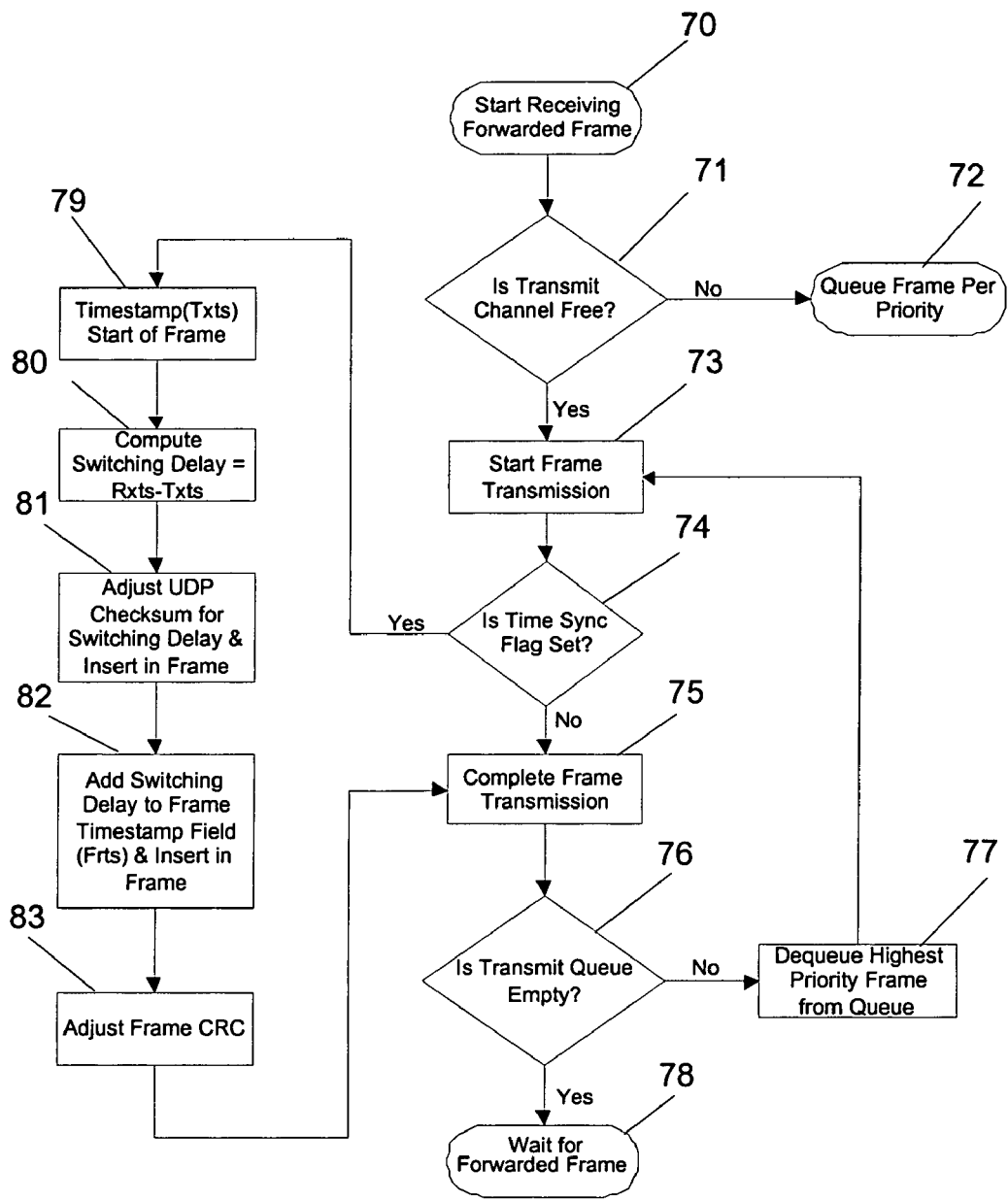
FIG. 6 is a flow chart for the receive channel hardware logic of any port in the switch of FIG. 2.

Next, it will be explained how the hardware logic in transmit and receive channels of any port in switch 12a updates the origin timestamp 93 in time synchronization messages "on the fly," as shown in FIGS. 5 and 6. It should be noted that the blocks in charts of FIG. 5 and FIG. 6 describe hardware logic that executes in parallel. As seen in FIG. 5, the hardware logic associated with the receive channel of any port in switch 12a starts receiving preamble 86 of a frame, as represented by start block 50. As represented by process block 51, when the timestamp point according to IEEE 1588 standard has been reached during frame reception, a timestamp trigger signal is sent to associated timestamp register 32-39 to capture receive timestamp (Rxts) from delay time counter 31. The captured receive timestamp (Rxts) is then copied from timestamp register 32-39 and saved in a frame descriptor block in memory (not shown) for the received frame. Next, as represented by process block 52, the destination 88 and source 89 network addresses in the message are extracted and saved into the frame descriptor block as and when they are received. Next, as represented by process block 53, a check is made for the presence of frame priority number 90 in the frame, when an appropriate point is reached during frame reception. If there is no frame priority number 90, as represented by the "no" branch from decision block 53, then the frame is assigned the lowest priority and the priority is saved to the frame descriptor block, as represented by process block 54. If there is a frame priority number 90, as represented by the "yes" branch from decision block 53, then the frame priority 90 is extracted from the message and saved to frame descriptor block as represented by process block 55. After executing process block 54 or process block 55, the hardware logic proceeds to decision block 56.

As represented by decision block 56, a check is made on frame priority, and if it is the highest priority, as signified by the "yes" result, this signifies that it may be a time synchronization message has been received. Then, as represented by process block 57, a UDP checksum 91 (FIG. 9) is extracted from the message and saved to the frame descriptor block as and when it is received. Subsequently, multiple locations in the frame, as and when they are received, are probed to confirm predefined values until a time synchronization message type identifier 92 is received to verify that this is a time synchronization message, as represented by decision block 58. If the answer is "yes," as represented by the "yes" branch from decision block 58, then a time sync flag is set in the frame descriptor block as represented by process block 59. Then, the origin timestamp field 93 (Orts) from the message is extracted and saved to a buffer descriptor block in memory when it is received, as represented by process block 60. The hardware logic then proceeds to decision block 61.

Returning to decision block 58, if the result of this decision is "no," then the message is not a time synchronization message and the hardware logic proceeds to decision block 61. Returning to decision block 56, if the result of this decision is "no", then the message is not a time synchronization message and the hardware logic proceeds to decision block 61. At decision block 61, a check is made to see if the frame source address is same as local port address. If the answer to this decision is "yes", then another check is made to see if the currently executing receive channel is part of local port as represented by decision block 62. If the answer to this decision is "no", then the frame is discarded as represented by end block 63. This discarding of frame prevents frames from going in endless loops in misconfigured ring topology networks and during network failure recovery transition from bus topology to ring topology. If the answer to decision block 62 is "yes" or if the answer to decision block 61 is "no", the hardware logic proceeds to decision block 64. At decision block 64, a check is made to see if the frame destination address is same as local port address. If the answer to this decision is "yes", then the frame is forwarded only to the transmit channel of the local port as represented by end block 66. If the answer to decision block 64 is "no", then the frame is forwarded to transmit channels of other daisy chain ports and of the local port as represented by end block 65. It should be noted that at end block 65 and end block 66, the receive channel hardware logic of a port will not forward frames to the transmit channel of its own port.

Referring next to FIG. 6, the hardware logic in transmit channel of any port begins receiving a forwarded frame as represented by start block 70 from block 65 or block 66 in FIG. 5. Then, a decision block 71 is executed to determine if the transmit channel is free to transmit the forwarded frame. If not, as represented by the "no" branch from decision block 71, then the message is queued according to priority in transmit channel queue as represented by connector block 72. If the answer is "yes," as represented by the "yes" branch from decision block 71, then transmission of a frame preamble is initiated as represented by process block 73. If a time synchronization flag has been set in FIG. 5, this is detected by execution of decision block 71 in FIG. 6. When a timestamp point according to IEEE 1588 standard is reached during transmission, a timestamp trigger is sent to associated timestamp register 32-39 to capture transmit timestamp (Txts) from delay time counter 31, as represented by process block 79. Next, the switching delay experienced by the frame inside switch is calculated by subtracting a saved receive timestamp (Rxts) from a transmit timestamp (Txts), as represented by process block 80. Next, as represented by process block 81, the UDP checksum for the time synchronization message is recomputed from the saved UDP checksum, for the added switching delay to origin timestamp at block 82 and inserted at appropriate location in frame. Next, as represented by process block 82, the switching delay is added to the saved origin timestamp and is inserted at the appropriate location in frame. Then, the CRC error checking code for the entire frame is computed and inserted at the end of frame, as represented by process block 83. The frame transmission is completed, followed by inter-frame gap according IEEE 802.3 standard and the transmit channel is ready for transmission as represented by process block 75.

If the message was not a time synchronization message, as represented by the "no" branch from decision block 74, then blocks 79-83 are skipped, the transmission of forwarded frame simply continues until completion, followed by inter-frame gap according IEEE 802.3 standard and the transmit channel is ready for transmission as represented by process block 75. In either event, the transmit channel queue is checked as represented by decision block 76. If the queue is empty, as represented by the "yes" result from executing decision block 76, then the hardware logic will wait for the next forwarded frame, as represented by end block 78. If the queue has one or more frames, as represented by the "no" result from executing decision block 76, then the hardware logic will dequeue the highest priority message, as represented by process block 77 and begin transmitting it, as represented by process block 73.

By adding delay in the switch to the received origin timestamp 93, the switch 12a becomes transparent to any downstream clocks. The adjustment accounts for random delays through the switch 12a, and then only fixed delays on the network media remain, which can be easily measured and compensated for. It should be noted that the switching delays are fully accounted for time synchronization messages in both master-to-slave and slave-to-mater paths.

Figure 7:
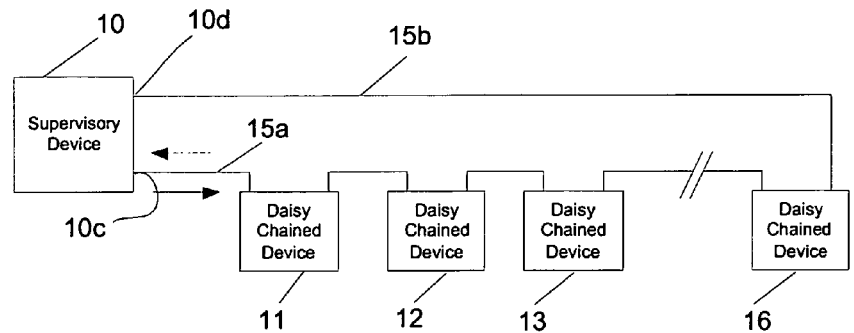
FIG. 7 is a system diagram illustrating a normal mode of operation for a ring topology network.
Figure 8:
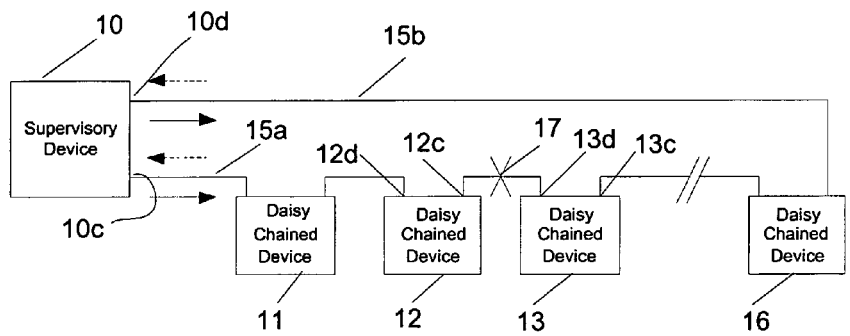
FIG. 8 is a system diagram illustrating failure mode of operation for network of FIG. 7.

Next, the redundancy aspects of the invention will be described in more detail. FIG. 7 shows a ring topology network in normal mode of network operation with redundant data paths 15a, 15b. FIG. 8 shows a mode of operation when there has been an interruption in communication at some point 17 in the ring. In both modes of operation, the special features required to support redundancy are enabled by CPU 10b on node 10, by setting appropriate control bits in switch control registers 25 on switch 10a.

In FIG. 7, the designated supervisory device 10 transmits all message frames through only one port 10c, but receives message frames through both ports 10c and 10d. All message frames which are transmitted from daisy-chained nodes 11, 12, 13 and 16 will appear at both ports 10c and 10d, but the second port 10d will discard most of the frames except for "delay request" messages to master clock on node 10 intended to measure delay for data path 15b through second port 10d and network failure notification frame from nodes 11, 12, 13 and 16 to node 10. On the other hand, port 10c will accept all frames except for "delay request" messages to master clock on node 10 intended to measure delay for data path 15b through second port 10d. Using port 10c and timestamp register 43 on switch 10a the slaves can measure delay to master clock on node 10 for data path 15a. Using port 10d and timestamp register 48 on switch 10a the slaves can measure delay to master clock on node 10 for data path 15b. In normal operation, and as part of a startup procedure, the nodes 11, 12, 13 and 16 will measure and save delay information relative to the master clock in the supervisory device 10 and further in relation to both data paths 15a and 15b.

The supervisory device 10 transmits a beacon message frame 95 illustrated in FIG. 8 from the first port 10c to the second port 10d, once every scheduled period, for example, every 250 microseconds, and monitors arrival of at least one beacon message on the second port 10d before a timeout (say 500 microseconds). As seen in FIG. 8, the beacon message frame 95 includes a preamble 96, a destination address 97 and a beacon message identifier 98 and a CRC 99 error checking code.

In addition, all nodes 10, 11, 12, 13 and 16 monitor the link status of their two ports from IEEE 802.3 physical layer (PHY) devices once every specified period, such as 250 microseconds. If there is a failure of communication due to a fault 17 as represented in FIG. 8, then nodes 12 and 13 will discover it through link status failure on ports 12c and 13d, and they will send link failure message to supervisory device 10 through their other working ports 12d and 13c.

In general, the supervisory device 10 may detect a link status failure on its ports 10c and 10d, or receive a link failure message from one of the nodes 11-13, 16, and enter failure mode. Alternatively, the supervisory device 10 will fail to receive at least one beacon message before timeout (500 microseconds), and will enter failure mode. Upon entering failure mode, the supervisory device 10 will then broadcast two different failure messages through the two ports 10c, 10d to all nodes 11, 12, 13 and 16 about the failure. The supervisory device 10 will then, by setting appropriate control bits in switch control registers 25 on switch 10*a*, start forwarding all message frames from port 10*c* to 10*d* and vice versa, effectively converting ring topology to bus topology. Daisy-chained nodes 11-13, 16 that receive a failure message from port 10*d* will change their delay relative to the master clock to the measured and saved delay information for data path 15*b*. While those nodes that received the failure message from port 10*c* will take note of the situation and will continue using measured delay information for data path 15*a*. This behavior ensures that time synchronization continues to work correctly. Meanwhile the nodes with failed link status ports will disable failed ports by setting appropriate control bits in control registers 25 on their switches. Since nodes are set up to tolerate data loss for a period more than timeout, the system will continue functioning normally. The supervisory device 10 then identifies link failure location and an alarm is set off for an operator through a human-machine interface. After the operator has restored the failed network link, the operator will reset the alarm and request normal operation. Upon receiving this request, the supervisory device 10 will broadcast a message with suitable time in future when all nodes 10-13 and 16 will return to normal mode of operation. The supervisory device 10 and all nodes 11-13, 16 will then return to normal mode precisely at appointed time. This involves re-enabling of disabled ports in the daisy-chained nodes 11-13, 16 by resetting appropriate control bits in control register 25 on their switches, with the daisy-chain connected nodes switching back to the measured delay information through data path 15*a* and the supervisory device 10 returning to its normal mode of operation by resetting appropriate control bits in control register 25 on switch 10*a*. The latter action converts the network back from bus topology to ring topology. As mentioned earlier in FIG. 5, the switches have a safety feature whereby frames are prevented from going into endless loops during this transition.

This has been a description of the preferred embodiment. It will be apparent to those of ordinary skill in the art, that certain details of the preferred embodiment may be modified to arrive at other embodiments without departing from the spirit and scope of the invention as defined by the following claims.

We claim:

1. A method of synchronizing node clocks within a plurality of nodes on a network including a time master node having a master clock and including at least one time slave node, the method comprising:

connecting the plurality of nodes through a full duplex Ethernet network with a daisy-chain connection of the nodes to each other;

transmitting a time synchronization message frame from one of the plurality of nodes to a second one of said plurality of nodes, the time synchronization message frame having a timestamp field according to IEEE 1588 standard and a checksum field and a cyclic redundancy checking code;

at a given one of the plurality of nodes between the first and second nodes:

(i) receiving the time synchronization message frame;

(ii) reading a timestamp value of a timestamp field of the time synchronization message frame;

(iii) near a time of retransmission of the time synchronization message frame from the given node, adjusting the read timestamp value in the timestamp field by an amount of delay between time of reception and a time of the retransmission to produce a corrected timestamp value;

(iv) writing the corrected timestamp value over the timestamp value of the timestamp field of the time synchronization message frame;

(v) adjusting a checksum value in the checksum field and adjusting the cyclic redundancy checking code of the time synchronization message frame to account for adjusting the timestamp value; and (vi) transmitting the time synchronization message frame from the given node; and providing a highest priority to process and forward time synchronization message frames and lower priorities to process and forward other types of message frames.

2. The method of claim 1, wherein the plurality of nodes are at least one of: an industrial controller, a network bridge, a motion control device, a discrete or process I/O device or a human-machine interface.

3. The method of claim 1, wherein the plurality of nodes are connected through two ports on each node and wherein at least one of the plurality of nodes provides a third port connecting to additional nodes on a full duplex Ethernet branch from a main portion of the network.

4. The method of claim 1, further comprising transmitting motion control data messages according to a coarse scheduler in every motion control related node and synchronizing operation of all the plurality of nodes based on the time synchronization to the master clock.

5. The method of claim 4, wherein the plurality of nodes connect to industrial controllers, network bridges, motion control devices, discrete and process I/O devices, and to human machine interfaces.

6. The method of claim 1, further comprising providing a highest priority to time synchronization message frames, a lower priority to motion control data message frames, a still lower priority to message frames with discrete or process I/O data and a lowest priority to message frames with non-critical configuration and other data and to message frames without any priority information; storing received message frames according to priority in at least one prioritized message queue in said one of the plurality of nodes; and transmitting message frames from said prioritized message queue according to the priorities associated with the respective message frames in said one of the plurality of nodes.

7. A method of synchronizing node clocks within a plurality of nodes on a network including a time master node having a master clock and including at least one time slave node, the method comprising:

connecting the plurality of nodes through a full duplex Ethernet network with a daisy- chain connection of the nodes to each other;

transmitting a time synchronization message frame from one of the plurality of nodes to a second one of said plurality of nodes, the time synchronization message frame having a timestamp field according to IEEE 1588 standard and a checksum field and a cyclic redundancy checking code;

receiving the time synchronization message frame at one of the plurality of nodes;

adjusting a timestamp value in the timestamp field by an amount of delay between time of reception and time of transmission at said one of the plurality of nodes;

adjusting a checksum value in the checksum field and adjusting the cyclic redundancy checking code to account for adjusting the timestamp value;

transmitting the time synchronization message frame from said one of the plurality of nodes to a second one of the plurality of nodes; and wherein one of the plurality of nodes is supervisory node including a first port for connection to a first data path through the network and a second port for connection to a second data path through the network;

forming the network in a ring including the first data path and the second data path from the supervisory node;

the first port in the supervisory node transmitting and receiving all frames except frames intended to measure time delay through the second data path and through the second port in the supervisory node in a normal mode of operation, and transmitting and receiving all frames in a failure mode of operation;

the second port in the supervisory node not transmitting and receiving any frame except frames intended to measure time delay through the second data path and link failure notification frames from other nodes in a normal mode of operation and transmitting and receiving all frames in a failure mode of operation;

the first and second ports not forwarding received frames from one to the other in the normal mode of operation and forwarding all received frames from one to the other in the failure mode of operation; and the plurality of nodes measuring and saving path delay data relative to master clock through the first data path and the second data path and through the first port and the second port on the supervisory node.

8. The method of claim 7, wherein the supervisory node is at least one of a special industrial controller, a special network bridge or a specially designed device.

9. The method of claim 7, wherein a network communication failure between plurality of nodes and the supervisory node is detected through:

periodic monitoring of link status of their respective first port and second port by supervisory node and by other nodes in the plurality of nodes, and notifying the supervisory node in case of link status failure; and periodically transmitting a beacon message from one of the first port and the second port of the supervisory node and monitoring arrival of at least one beacon message on a second one of the first port and the second port of supervisory node within a predefined time period.

10. The method of claim 7, wherein the supervisory node transmits a network failure message to other nodes in the plurality of nodes, and wherein the other nodes that receive the network failure message at a port associated with the second port of the supervisory node and master clock data related to the second port will change their path delay data from first path delay data to the second path delay data.

11. The method of claim 7, wherein the supervisory node will change operation of said first port and said second port upon entering the failure mode of operation, by forwarding and transmitting frames received on one of said first port and said second port to the other of said first port and said second port and thereby convert the network from ring topology to bus topology.

12. The method of claim 11, wherein the plurality of nodes restore the normal mode of operation at a predetermined time by switching back to measure time delay associated with the first data path and at a same time the supervisory node changes to normal mode of operation thereby converting the network back to a ring topology.

13. A node circuit for synchronizing node clocks within a plurality of daisy-chain connected nodes on an Ethernet network to a master clock in one of the plurality of nodes, the node circuit comprising:

a switch circuit having at least two ports for connection to the network, each port providing a receive channel and a transmit channel for full duplex operation on the Ethernet network, the switch circuit also having a delay time clock and a node clock, the receive channel of a port receiving a time synchronization message frame having a timestamp value in a timestamp field, a checksum value in a checksum field and a cyclic redundancy checking code for the message frame;

the switch circuit also having at least one prioritized message queue for storing message frames of varying priorities;

wherein the switch circuit further comprises:

a first portion of logic for receiving frames through a receive channel and detecting time synchronization message frames during reception and a time of reception of the time synchronization message frames;

a second portion of logic for:
(i) reading a timestamp value of a timestamp field of the time synchronization message frame;
(ii) adjusting the timestamp value in the timestamp field, near a time of retransmission of the timestamp value, by an amount of delay between the time of reception and a time of retransmission to another one of the plurality of nodes and
(iii) writing the corrected timestamp value over the timestamp value of the timestamp field of the time synchronization message frame; wherein the adjusting of the timestamp is carried out as the message frame is received and forwarded to a second one of the plurality of nodes without utilizing a boundary clock according to IEEE standard 1588;

a third portion of logic for adjusting the checksum value in the checksum field and adjusting the cyclic redundancy checking code of the time synchronization message frame to account for adjusting the timestamp value; and a fourth portion of logic for transmitting the time synchronization message frame with adjusted values from a transmit channel to a second one of the plurality of nodes; and wherein message frames are transmitted from at least one prioritized message queue with a highest priority being provided to process and forward time synchronization message frames and lower priorities being provided to process and forward other types of message frames.

14. The node circuit of claim 13, wherein the switch circuit is an application specific integrated circuit.

15. The node circuit of claim 13, wherein the switch circuit has first and second ports for connection to a main portion of the network and a third port for connection to a branch from the main portion of the network, each port having a receive channel and a transmit channel for full duplex operation.

16. The node circuit of claim 13, wherein said switch has a plurality of timestamp registers, two for each port corresponding to the receive channel and transmit channel, respectively.

17. The node circuit of claim 13, wherein the node circuit is incorporated in at least one of: an industrial controller, a network bridge, a motion control device, a discrete or process I/O device or a human-machine interface.

18. The node circuit of claim 13, wherein the switch circuit enforces priority encoded on received frames during network transmission of said frames.

19. A node circuit for synchronizing node clocks within a plurality of daisy-chain connected nodes on an Ethernet network to a master clock in one of the plurality of nodes, the node circuit comprising:

a switch circuit having at least two ports for connection to the network, each port providing a receive channel and a transmit channel for full duplex operation on the Ethernet network, the switch circuit also having a delay time clock and a node clock, the receive channel of a port receiving a time synchronization message frame having a timestamp value in a timestamp field, a checksum value in a checksum field and a cyclic redundancy checking code for the message frame;

wherein the switch circuit further comprises:

a first portion of logic for receiving frames through a receive channel and detecting time synchronization message frames during reception;

a second portion of logic for adjusting the timestamp value in the timestamp field by an amount of delay between time of reception and time of transmission to another one of the plurality of nodes;

a third portion of logic for adjusting the checksum value in the checksum field and adjusting the cyclic redundancy checking code to account for adjusting the timestamp value; and a fourth portion of logic for transmitting the time synchronization message frame with adjusted values from a transmit channel to a second one of the plurality of nodes; and wherein the switch circuit upon setting certain control bits causes:

the first port to transmit and receive all frames except frames intended to measure data path delay through a second one of the two ports;

the second port to not transmit and receive frames except frames intended to measure data path time delay through the second one of the two ports and link failure notification frames; and the first port and the second port do not forward frames received by one to the other.

20. The node circuit of claim 19, wherein the switch circuit further comprises additional logic and timestamp registers to distinguish and time stamp message frames intended to measure delay through first and second data paths through first and second respective ports in the two ports for connection to the network.

21. The node circuit of claim 20, wherein the switch circuit upon resetting certain control bits causes the first and second ports to receive and transmit all frames and to forward frames received on one of the two ports to another of the two ports for transmission.

22. The node circuit of claim 19, wherein the switch circuit is an application specific integrated circuit.

23. The node circuit of claim 19, wherein the switch circuit has first and second ports for connection to a main portion of the network and a third port for connection to a branch from the main portion of the network, each port having a receive channel and a transmit channel for full duplex operation.

24. The node circuit of claim 19, wherein said switch has a plurality of timestamp registers, two for each port corresponding to the receive channel and transmit channel, respectively.

25. The node circuit of claim 19, wherein the node circuit is incorporated in at least one of: an industrial controller, a network bridge, a motion control device, a discrete or process I/O device or a human-machine interface.

26. The node circuit of claim 19, wherein the switch circuit enforces priority encoded on received frames during network transmission of said frames.

* * * * *

UNITED STATES PATENT AND TRADEMARK OFFICE
CERTIFICATE OF CORRECTION

PATENT NO. : 7,649,912 B2  Page 1 of 1
APPLICATION NO. : 11/115536
DATED : January 19, 2010
INVENTOR(S) : Balasubramanian et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Twenty-third Day of November, 2010

David J. Kappos
*Director of the United States Patent and Trademark Office*